United States Patent
Kleeberger

(10) Patent No.: US 11,099,006 B2
(45) Date of Patent: Aug. 24, 2021

(54) USE OF A CONTACTLESSLY WORKING OPTICAL LASER TRIANGULATION METHOD FOR DETERMINING GEOMETRIC PROPERTIES OF A BRAKE LINING

(71) Applicant: KNORR-BREMSE SYSTEME FÜR SCHIENENFAHRZEUGE GMBH, Munich (DE)

(72) Inventor: Peter Kleeberger, Puchheim (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 0 days.

(21) Appl. No.: 16/477,793

(22) PCT Filed: Jan. 4, 2018

(86) PCT No.: PCT/EP2018/050169
§ 371 (c)(1),
(2) Date: Jul. 12, 2019

(87) PCT Pub. No.: WO2018/130451
PCT Pub. Date: Jul. 19, 2018

(65) Prior Publication Data
US 2020/0124404 A1    Apr. 23, 2020

(30) Foreign Application Priority Data

Jan. 12, 2017  (DE) .................... 10 2017 100 539.0

(51) Int. Cl.
*G01B 11/24*    (2006.01)
*F16D 65/092*   (2006.01)
*F16D 69/04*    (2006.01)

(52) U.S. Cl.
CPC ............ *G01B 11/24* (2013.01); *F16D 65/092* (2013.01); *F16D 69/04* (2013.01); *F16D 2069/0433* (2013.01)

(58) Field of Classification Search
CPC ....... B60T 13/665; B60T 17/228; B61H 5/00; F16D 2069/0433; F16D 2250/0084; F16D 65/092; F16D 69/04; G01B 11/24
(Continued)

(56) References Cited

U.S. PATENT DOCUMENTS

2013/0083188 A1* 4/2013 Mian .................... G01B 11/06
                                                    348/135

FOREIGN PATENT DOCUMENTS

CN    201069355 Y    6/2008
CN    201902482 U    7/2011
(Continued)

OTHER PUBLICATIONS

International Search Report & Written Opinion corresponding to PCT/EP2018/050169 dated Jun. 20, 2018.
(Continued)

*Primary Examiner* — Tri T Ton
(74) *Attorney, Agent, or Firm* — Barnes & Thornburg LLP

(57) ABSTRACT

The invention relates to a use of a contactlessly working optical laser triangulation method for detecting at least one geometric property of a brake lining of a disc brake of a vehicle and/or of at least one component of the components of the brake lining before an initial commissioning or before an assembly of the brake lining and/or the at least one component of the components of the brake lining in the disc brake.

7 Claims, 5 Drawing Sheets

(58) Field of Classification Search
USPC .................................................. 356/600–640
See application file for complete search history.

(56) References Cited

FOREIGN PATENT DOCUMENTS

| | | | |
|---|---|---|---|
| CN | 102278953 | A | 12/2011 |
| CN | 102818523 | A | 12/2012 |
| CN | 203163699 | U | 8/2013 |
| DE | 4436457 | A1 | 4/1996 |
| DE | 19709962 | C1 | 10/1998 |
| JP | 2000337825 | A | 12/2000 |

OTHER PUBLICATIONS

SICK AG: Product catalog 2014/21015: Vision—Vision sensors, smart cameras, high-end cameras, Waldkirch, May 6, 2013 (8015547) (124 pages).
Chinese Office Action corresponding to CN201880006780.7 dated Feb. 23, 2021.

\* cited by examiner

USE OF A CONTACTLESSLY WORKING OPTICAL LASER TRIANGULATION METHOD FOR DETERMINING GEOMETRIC PROPERTIES OF A BRAKE LINING

CROSS REFERENCE AND PRIORITY

This patent application is a U.S. National Phase of International Patent Application No. PCT/EP2018/050169 filed Jan. 4, 2018, which claims priority to German Patent Application No. 10 2017 100 539.0 filed Jan. 12, 2017, the disclosure of which being incorporated herein by reference in their entireties.

FIELD

Disclosed embodiments relate to the use of a contactlessly operating laser triangulation method.

BACKGROUND

A method of using contactlessly operating laser triangulation is described, for example, in WO2004/085957 and serves there for the determination of wear on wheel profiles of rail vehicle wheels as the rail vehicle passes by.

SUMMARY

Disclosed embodiments provide a novel and advantageous use of a contactlessly operating optical laser triangulation method.

BRIEF DESCRIPTION OF THE FIGURES

The disclosed innovations will be described in more detail herein on the basis of exemplary embodiments with reference to the appended figures, in which.

DETAILED DESCRIPTION

Figure 1:
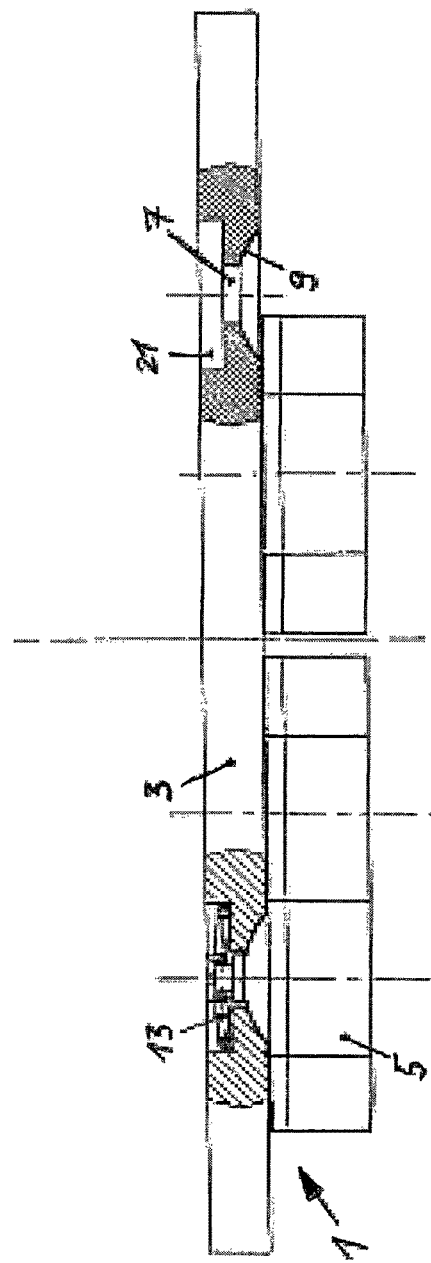
FIG. 1 shows a partially sectional view of a first embodiment of the brake pad with carrier panel and with friction elements pivotably articulated thereon directly under spring bracing action.
Figure 2:
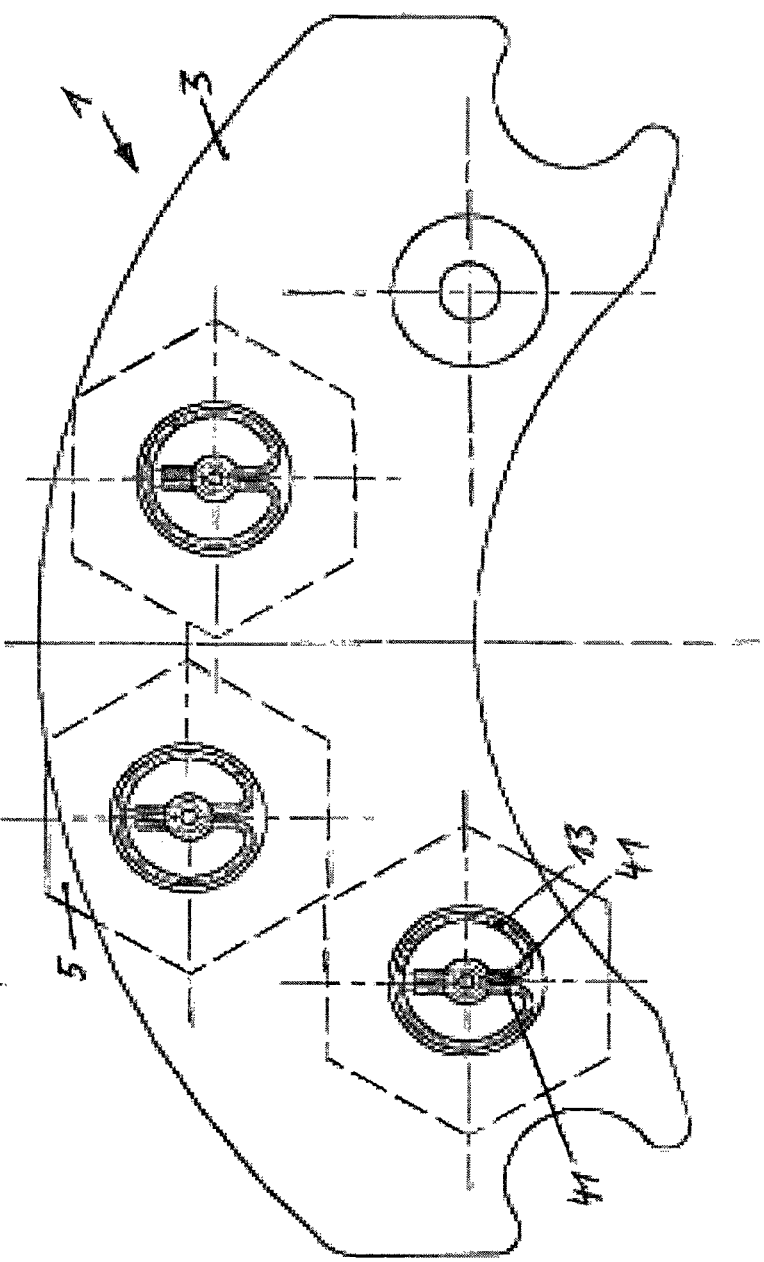
FIG. 2 shows a plan view, seen from below in the view in FIG. 1, of a carrier panel.

In the case of brake pads together with brake disks of disk brakes of rail vehicles, embodiments exist in which friction elements of a brake pad have ball segments which are pivotably and detachably braced together with complementary ball sockets of a carrier panel or of a carrier plate by bracing springs. It is then possible, on the one hand, for individual friction elements of a brake pad to be exchanged in the event of inadmissible wear.

As shown in DE 197 09 962, in the released state of the disk brake, the ball segments of the friction elements are held in the ball sockets of the carrier panel or of the carrier plate in a play-free and rattling-free manner by the preload of the bracing springs. During the application of the disk brake, the application force of the pad holder which supports the carrier panel performs the fixing of the ball segments of individual friction elements in the associated ball sockets of the carrier panel. The radii of curvature of the ball sockets and of the ball segments are configured such that the resultant composed of friction force and pressing force lies within the ball contact area. Owing to the ball-type, spring-braced and pivotable attachment of the friction elements to the carrier panel, the friction surfaces of the friction elements can bear closely against the surface of the brake disk during the application of the disk brake, whereby small unevennesses can be compensated. In this way, an improved contact pattern can be realized, and formation of "hot spots" is avoided.

As shown in DE 44 36 457, a carrier panel, multiple carrier plates and multiple exchangeable friction elements are provided, wherein multiple friction elements are pivotably held directly on in each case one carrier plate by ball segment/ball socket pairings, and multiple carrier plates with friction elements held pivotably thereon are connected to the carrier panel.

Therefore, by the type of fastening, owing to the spring preload, rattling-free guidance of the friction elements on the carrier panel or on the carrier plate is realized, and the ball-type connection provides an improved contact pattern, and in principle, easier installation and uninstallation of the individual friction elements is made possible. The simplified installation and uninstallation also makes it possible for carrier panels or carrier plates to be reused several times.

During the installation of such brake pads in particular, installation errors and/or manufacturing deviations may give rise to instances of incorrect installation which cannot be readily visually identified and which, during later operation, can lead to a loss of one or more friction elements. It is, therefore, common, after the installation of a brake pad and prior to an initial commencement of operation of a brake pad, for this to be visually checked by manufacturing personnel.

However, not all faults can be reliably identified on the basis of a visual check of the brake pads by manufacturing personnel, because such a visual inspection is too imprecise and not all details can be ascertained, and is furthermore generally only two-dimensional, that is to say, in particular, faults perpendicular to the plane of the drawing cannot be ascertained. Furthermore, the visual check also cannot identify manufacturing deviations in the components to be installed. The aim of the check of brake pads prior to an initial commencement of operation must therefore be to reliably ascertain as many instances of incorrect installation and manufacturing deviations of components of the brake pads as possible.

According to disclosed embodiments, a contactlessly operating optical laser triangulation method is used for ascertaining at least one geometrical characteristic of a brake pad of a disk brake device of a vehicle and/or of at least one component of the components of the brake pad prior to an installation or an initial commencement of operation of the brake pad and/or of the at least one component of the components of the brake pad in the disk brake device or in the vehicle.

The components of the brake pad may in particular have the following:

a) in a first embodiment described for example in DE 197 09 962, a carrier panel and multiple exchangeable friction elements, wherein the friction elements are pivotably held directly on the carrier panel, or b) in a second embodiment described for example in DE 44 36 457, a carrier panel, multiple carrier plates and multiple exchangeable friction elements, wherein multiple friction elements are pivotably held directly on in each case one carrier plate, and multiple carrier plates with friction elements held pivotably thereon are connected to the carrier panel.

Such a contactlessly operating optical laser triangulation method nowadays permits an exact and reliable execution of contactless measurements with depth resolutions into the micrometer range, and is therefore particularly suitable for the ascertainment of geometrical characteristics of a brake pad of a disk brake of a rail vehicle and/or of at least one component of the components of the brake pad prior to an initial commencement of operation of the brake pad in the disk brake.

Prior to an initial commencement of operation of the brake pad or prior to the installation in the disk brake device means that the brake pad examined using the contactlessly operating optical laser triangulation method has not yet been used for the intended operation in the disk brake, and is therefore free from wear. This is because it is the intention to use the contactlessly operating optical laser triangulation method to ascertain in particular the type and/or the form and/or the position of at least one component of the components of the brake pad, for example in order to detect manufacturing and/or installation faults in the brake pad by a comparison with predefined setpoint values or setpoint value ranges for the type and/or the form and/or the position of at least one component of the components of the brake pad. A fault signal may be generated in the event of a manufacturing and/or installation fault in the brake pad being detected.

Such a manufacturing and/or installation fault in the brake pad may for example consist in a component of the brake pad not being intended for installation together with the other components (type of the component). Furthermore, geometrical characteristics are to be understood to mean any characteristics which relate to the form (circular, polygonal, cylindrical, radii etc.) and/or the position (alignment, angle, spacing etc.) of one or more components in relation to another component or in relation to other components. Relative geometrical characteristics of one or more components in relation to another component or in relation to other components may be obtained in particular from absolute geometrical characteristics obtained in relation to a reference.

In the contactlessly operating optical laser triangulation method, it is possible for a laser to be used to project a spot of light onto the brake pad and/or onto the at least one component of the components of the brake pad in an illumination direction, and the light to be reflected by the brake pad and/or by the at least one component of the components of the brake pad in an observation direction being imaged on a light-receiving element, wherein the type and/or the form of the brake pad and/or the type and/or the form and/or the position of the at least one component of the components of the brake pad is ascertained on the basis of the angle between illumination direction and observation direction by triangulation. In the laser triangulation method, it is also possible for the laser light beam to be widened to form a linear light band, a so-called light section. For the ascertainment of the reflected light, use may be made here of an areal detector, such as for example a video camera. The evaluation is in turn performed on the basis of the triangulation.

The contactlessly operating optical laser triangulation method may be used in the case of brake pads of disk brake devices of rail vehicles. A rail vehicle is to be understood to mean a rail-bound vehicle such as a locomotive, a rail motor set, a rail motor coach, a tram, an underground rail vehicle, or a wagon such as a passenger and/or freight car, in particular a high-speed rail vehicle. A disk brake device comprises not only the brake pads but also at least one brake disk and further components such as for example a brake caliper for holding the brake pads.

The first abovementioned embodiment of brake pad in the case of which the contactlessly operating optical laser triangulation method for ascertaining the geometrical characteristics may be used is characterized in that a1) the friction elements are, by ball segments formed on the rear side thereof, arranged pivotably in a ball socket of the carrier panel or of a carrier plate, a2) the ball socket has a bore which transitions into a bore of the carrier panel or of the carrier plate, a3) fastening pegs extend from the ball segments of the friction elements, a4) the fastening pegs bear in each case one bracing spring which braces the friction element in the direction of the ball socket.

The second abovementioned embodiment in the case of which the contactlessly operating optical laser triangulation method for ascertaining the geometrical characteristics may be used is characterized in that b1) the carrier plates have, on their rear side pointing away from the friction elements, ball segments which are arranged pivotably in ball sockets of the carrier panel, b2) the ball sockets of the carrier panel each have a bore which transitions into a bore of the carrier panel, b3) from the ball segment of a carrier plate there extends a peg which engages into the bore of the carrier panel.

Then, the at least one geometrical characteristic of the brake pad and/or of the at least one component of the components of the brake pad may be formed by one of the following characteristics: the type and/or the form and/or the position of the carrier plates and/or of the carrier panel and/or of the friction elements and/or of the fastening pegs and/or of the pegs and/or of the bracing springs, wherein this list is not exhaustive.

In one refinement, the ascertainment of the at least one geometrical characteristic of the at least one component of the components of the brake pad may be performed in a state of the component installed on the brake pad or in a state of the component prior to the installation on the brake pad.

With this understanding of the disclosed embodiments in mind, FIG. 1 of the drawing illustrates a sintered brake pad 1 according to a first embodiment, which is composed substantially of a carrier panel 3 and of friction elements 5 arranged directly on the carrier panel. The friction elements 5 are manufactured from sintered material. The carrier panel 3 has, correspondingly to the selected arrangement of the friction elements 5, bores 7 which each transition at their end facing toward the brake disk (not illustrated) into a ball socket 9 (at the bottom side in FIG. 1). Ball segments 11

(FIG. 3) of the friction elements 5 are situated in the ball sockets 9, which ball segments are connected to the carrier panel 3 in the manner described below by bracing springs 13.

Figure 3:
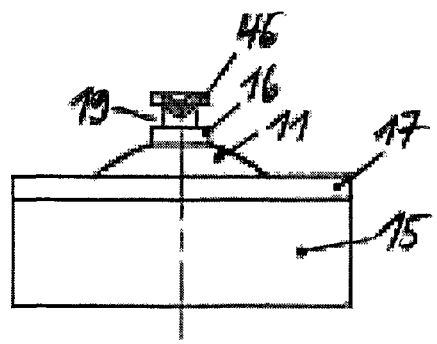
FIG. 3 shows a detail view of a friction element of the first embodiment with fastening pegs extending therefrom.
Figure 4:
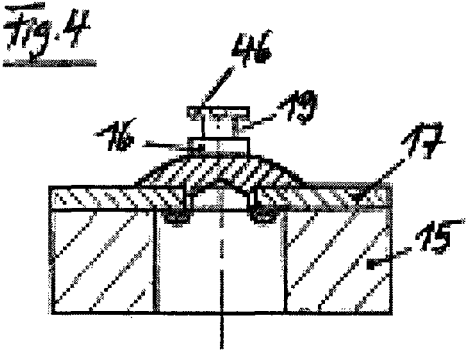
FIG. 4 shows a sectional view of the friction element as per FIG. 3, illustrating the connection between the friction material of the friction element and the ball peg.

In FIG. 3, the friction elements 5 are formed in each case from the friction pad part 15 and the integrated ball segment 11; the latter at the same time bears the fastening peg 17. The ball segment 11 may be manufactured as a single piece with a carrier plate 17 which bears the friction pad 15, though may also be riveted to the carrier plate 17 in the manner illustrated in FIG. 4. The fastening peg 17 extends, in the manner visible from FIG. 1, through the bore 7 of the carrier panel; the fastening peg has a turned recess 19 into which the bracing spring 13 is engaged with detent action in the manner described below. The bracing spring 13 is capable, by its elasticity of shape, of pressing the friction element against the ball sockets 9. Here, the bracing spring is situated in a depression 21 of the carrier panel 3. Owing to this flat type of construction, the brake pad can be of conventional design, as is common in the case of UIC dovetail guides.

The bracing spring 13 is of domed form and, in order to generate a preload, is placed into the position illustrated in FIG. 1 in the manner described below such that, in the unbraked state, the friction element 5 is held in the ball socket 9 by the preload of the bracing spring 13, specifically without play, that is to say without rattling. During braking, the application force of the brake holder that bears the carrier panel 3 performs the fixing of the individual friction elements 5 in their ball sockets 9. The radii of curvature of the ball sockets 9 and of the ball segments 11 are configured such that the resultant of friction force and pressing force lies within the ball contact area. Owing to the ball-type, spring-braced attachment of the friction elements 5 in the carrier panel 3, the friction elements can adapt to regions of small unevennesses of the brake disk. In this way, an improved contact pattern can be realized, and the formation of "hot spots" is avoided.
By the type of fastening, owing to the spring preload, rattling-free guidance of the friction elements 5 on the carrier panel 3 is realized, and the ball-type connection provides an improved contact pattern, and in principle, easier installation and uninstallation of the individual friction elements 5 is made possible. The simplified installation and uninstallation also makes it possible for the carrier panels 3 to be reused several times.

Figures 5, 6:
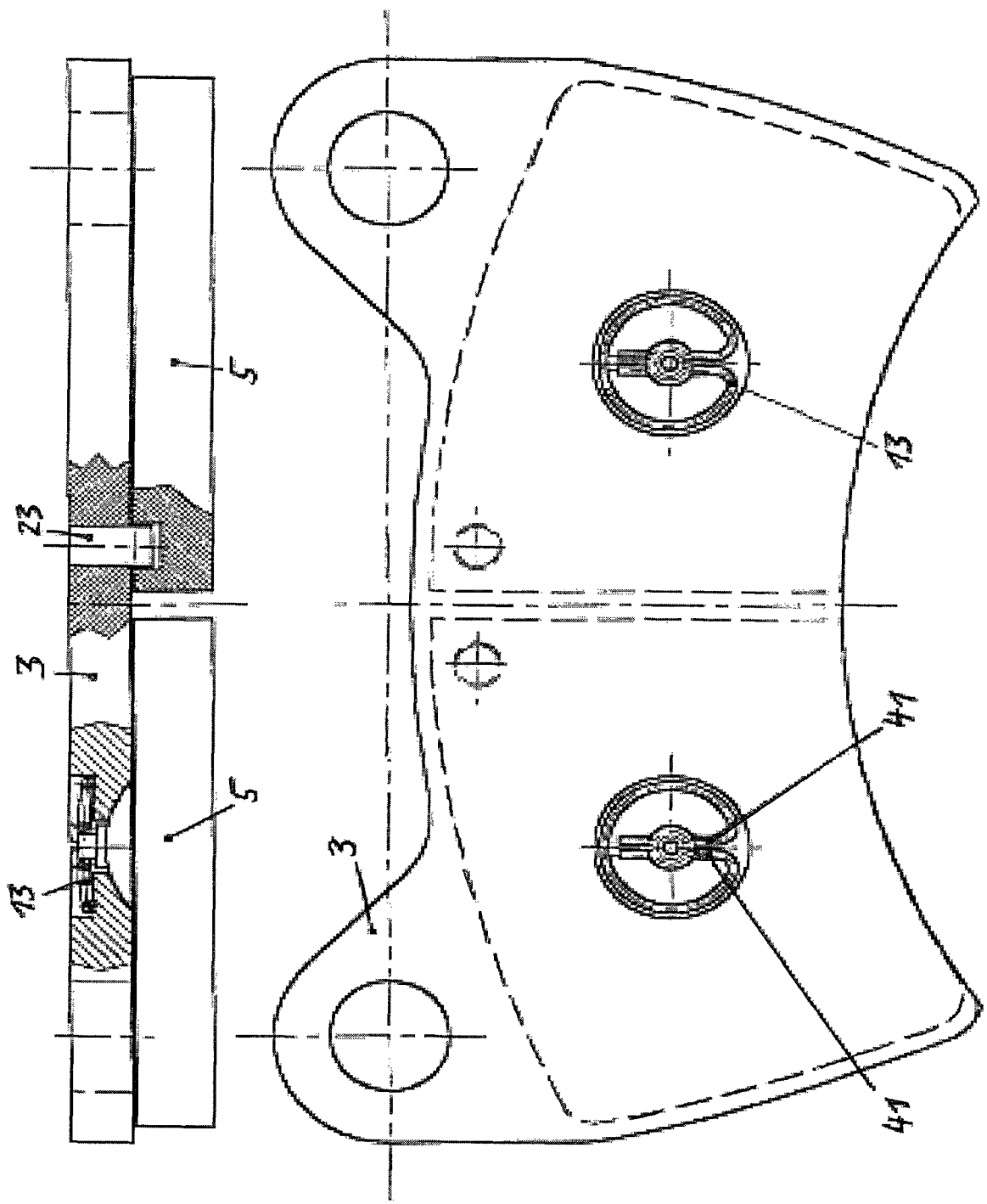
FIG. 5 shows a partially sectional view, similar to FIG. 1, of a brake pad according to a variant of the first embodiment.
FIG. 6 shows a plan view, seen from below, of the brake pad illustrated in FIG. 5.

Variants of the described arrangement relate to the geometrical configuration of the carrier panels 3 and friction elements 5 that are used. It is thus possible for friction element 5, carrier plate 17 and fastening peg 16 to be manufactured by sintering methods as a single-piece component; friction element 5 and carrier plate 17 may be manufactured as a single-piece component in relation to which the fastening peg 16 with ball segment 11 is separate. The arrangement can also be used for organic linings. It is also possible for the carrier panels 3, with a modification of their geometrical dimensions, to be used for brake caliper arrangements. The carrier panel 3 illustrated in FIG. 5 and FIG. 6 corresponds to such an embodiment for use in the slot of a brake caliper, wherein the friction elements 5 are, in a modification in relation to the friction elements of the embodiment discussed above, of large-area form, and may have additional structure such as the illustrated pin 23, for fixing in position.

To fit the bracing springs 13 onto the fastening pegs 16 of the friction elements 5, a spring spreader (not shown here) is used. The bracing spring 13 is equipped with limbs 41 which are bent inwardly and converge from its outer circumference, wherein, at the convergence of the two limbs 41, there is a gap which, in the installed state, engages into the turned recess 19 of the fastening peg 16, with the two limbs 41 being braced. After the limbs 41 have been spread apart by the spring spreader, the two limbs 41 can be closed again, and here, assume their installation position as per FIG. 1 and FIG. 5 in the turned recess 19 of the fastening peg 16, such that, by the bracing spring 13, a high tensile force is exerted on the fastening peg 16 and the friction element 5 is held, without rattling, within the degree of freedom of its ball mobility relative to the carrier panel 3.

The uninstallation of the bracing springs 13 by spreading-apart of the spring part or the two limbs 41 may be performed by simple spreader forceps, and the exchange of the friction elements 5 can accordingly be performed even in the installed position on the carrier panel 3. The carrier panel 3 is itself not exchanged, and is provided for repeated use, which contributes to inexpensive installation and storage.

Figure 7:
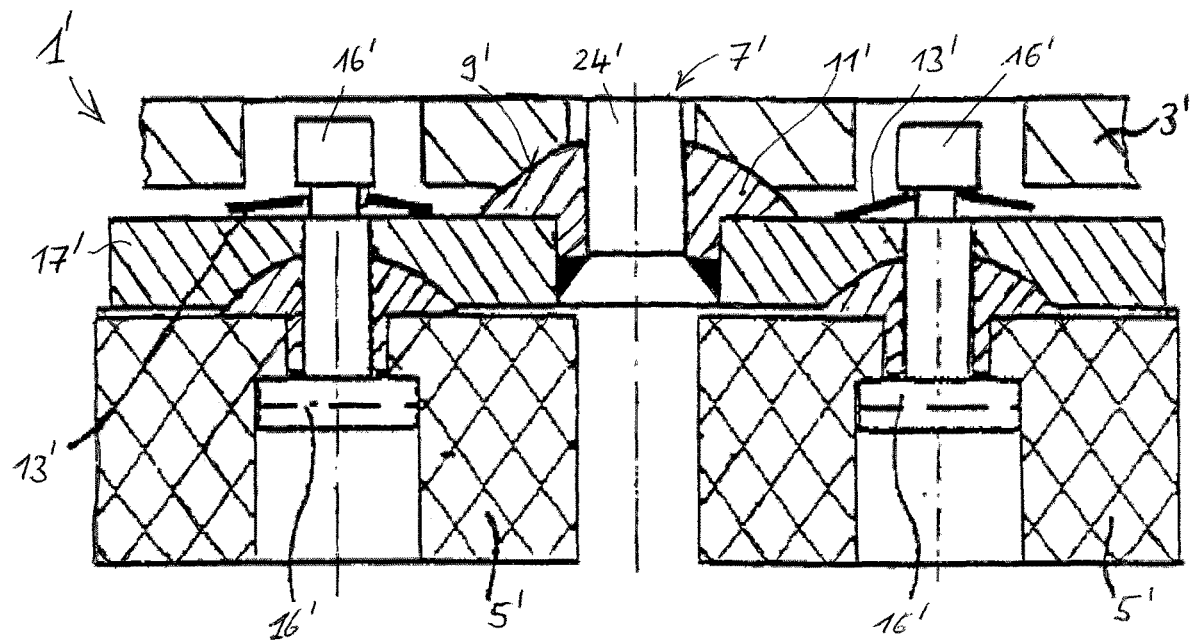
FIG. 7 shows a partially sectional view of a brake pad according to a second embodiment, with a carrier panel and with carrier plates which are pivotably arranged on the carrier panel and which have friction elements arranged pivotably thereon.
Figure 8:
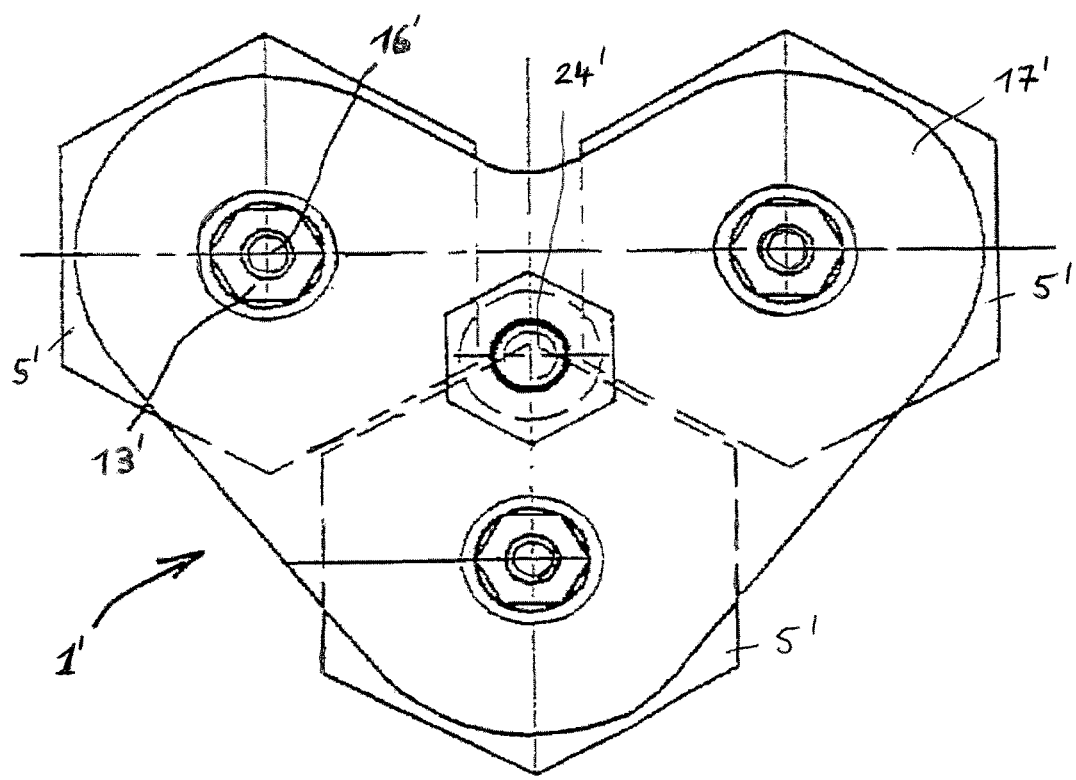
FIG. 8 shows a plan view of a carrier plate with, for example, three friction elements.

FIG. 7 and FIG. 8 show a second embodiment of a brake pad 1' in partial section, in which there are likewise provided a carrier panel 3' and friction elements 5' but additionally multiple carrier plates 17', wherein multiple, in this case optionally three, friction elements 5' are held pivotably directly on in each case one carrier plate 17', and multiple carrier plates 17' with friction elements 5' pivotably held thereon are connected to the carrier panel 3'.

In detail, the carrier plates 17' have, on their rear side pointing away from the friction elements 5', ball segments 11' which are arranged pivotably in ball sockets 9' of the carrier panel 3'. Furthermore, the ball sockets 9' of the carrier panel 3 each have a bore which transitions into a bore 7' of the carrier panel 3'. Ball segments 11' of the carrier plates 17' are arranged in the ball sockets 9'. Furthermore, from the ball segment 11' of a carrier plate 17', there extends in each case one peg 24', which engages into a bore 7' of the carrier panel 3'. Optionally, a carrier plate 17' has for example three friction elements 5' and, for this purpose, has for example three limbs which are arranged in stellate fashion, wherein a friction element 5' is held on each of the limbs. Furthermore, the carrier plates 17' and friction elements 5' have, as in the first embodiment, ball segment/ball socket pairings which can be braced by bracing springs 13' and which permit a pivoting of the friction elements 5' relative to the carrier plates 17' and an exchange of the friction elements 5'. Consequently, in the second embodiment as per FIG. 5 and FIG. 6, the friction elements 5' are pivotably connected indirectly, specifically via carrier plates 17', to the carrier panel 3'.

Figure 9:
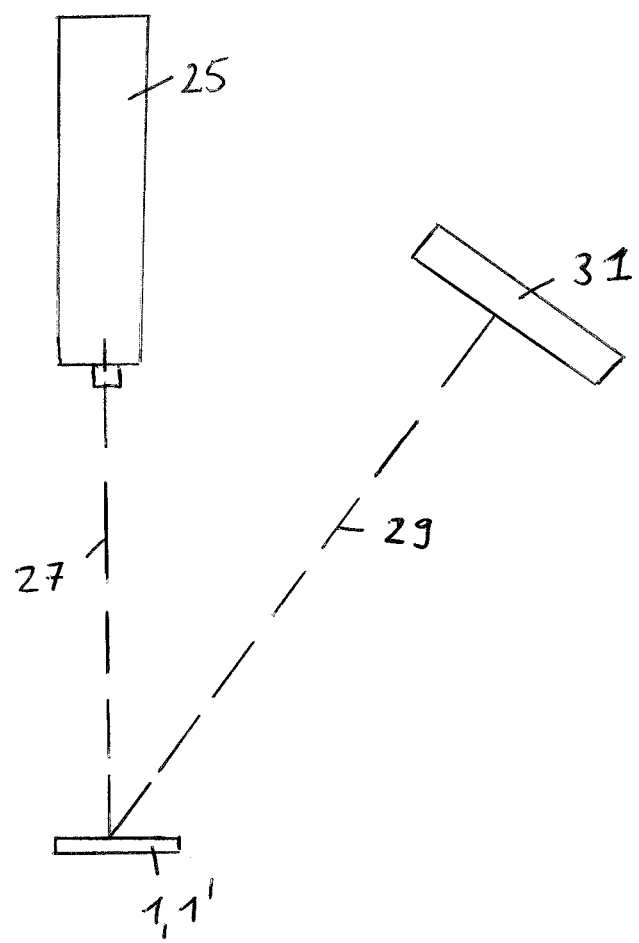
FIG. 9 is a highly schematic illustration of a contactlessly operating optical laser triangulation method according to an exemplary embodiment.

Use is made of a contactlessly operating optical laser triangulation method as per FIG. 9 for ascertaining at least one geometrical characteristic of an above-described brake pad 1, 1' and/or of at least one component of the components of an above-described brake pad 1, 1' prior to an initial commencement of operation of the brake pad 1, 1' in the disk brake. Here, components are to be understood to mean all above-described parts and assemblies described above, but also parts and assemblies which are not described, of the brake pads 1, 1'.

The contactlessly operating optical laser triangulation method is used to ascertain in particular the type and/or the form and/or the position of at least one component of the components of the brake pad 1, 1', for example in order to detect manufacturing and/or installation faults in the brake pad 1, 1' under consideration by a comparison with pre-defined setpoint values or setpoint value ranges or those stored in a memory for the type and/or the form and/or the position of at least one component of the components of the brake pad 1, 1'.

Such a manufacturing and/or installation fault in the brake pad 1, 1' may for example consist in a component of the brake pad 1, 1' not being intended for installation together with the other components (type of the component). Furthermore, geometrical characteristics are to be understood to mean any characteristics which relate to the form (circular, polygonal, cylindrical, radii etc.) and/or the position (alignment, angle, spacing etc.) of one or more components in relation to another component or in relation to other components. Relative geometrical characteristics of one or more components in relation to another component or in relation to other components may be obtained in particular from absolute geometrical characteristics obtained in relation to a reference.

For example, in the first embodiment as per FIG. 1-FIG. 6 and also in the second embodiment as per FIG. 7 and FIG. 8, it is checked whether the carrier panel 3, 3' is the carrier panel that is intended for being equipped with a particular type of friction elements 5, 5'. Furthermore, it is also the case in the case of the second embodiment as per FIG. 7 and FIG. 8, that the level of the pegs 24', received in the bores 7' of the carrier panel 3', of the carrier plate 17' relative to the surface of the carrier panel 3', and also the pegs 24' themselves, may be checked as regards whether they have damage for example in the form of broken-away portions. In the first embodiment of FIG. 1 to FIG. 6, it is for example also the case that the size of the gap between the limbs 41 of the bracing springs 13 installed on the fastening peg 16 is checked, because this is an indication of the correct installation of the bracing springs 13. Furthermore, it is also possible for the orientation of the bracing springs 13 installed on the fastening peg 16 of the friction elements 5, 5' to be detected. Furthermore, in the non-installed state of the friction elements 5, 5', the length of the fastening peg 16 thereof may be measured. The above list of measurements performed with regard to the geometrical characteristics of the brake pads 1, 1' or of the components thereof is not complete. Rather, any geometrical characteristic (type, position, form) of any component of a brake pad 1, 1' may be determined.

In the contactlessly operating optical laser triangulation method according to FIG. 9, a laser 25 is used to project a spot of light onto the brake pad 1, 1' and/or onto at least one component of the components of the brake pad 1, 1' in an illumination direction 27, and the light reflected by the brake pad 1, 1' and/or by the at least one component of the components of the brake pad 1, 1' in an observation direction 29 is imaged on a light-receiving element 31, wherein the geometrical characteristics such as type and/or the form of the brake pad 1, 1' and/or the type and/or the form and/or the position of at least one component of the components of the brake pad 1, 1' are ascertained on the basis of the angle between illumination direction 27 and observation direction 29 by triangulation. In the laser triangulation method, it is also possible for the laser light beam to be widened to form a linear light band, a so-called light section. For the ascertainment of the reflected light, use may be made here of an areal detector, such as for example a video camera. The evaluation is in turn performed on the basis of the triangulation.

LIST OF REFERENCE DESIGNATIONS

1, 1' Brake pad
3, 3' Carrier panel
5, 5' Friction elements
7, 7' Bores
9, 9' Ball socket
11, 11' Ball segments
13, 13' Bracing spring
15 Friction pad part
16, 16' Fastening peg
17, 17' Carrier plate
19 Turned recess
21 Depression
23 Pin
24' Peg
25 Laser
27 Illumination direction
29 Observation direction
31 Light-receiving element
41 Limb

The invention claimed is:

1. A method for ascertaining at least one geometrical characteristic of a brake pad of a disk brake device of a vehicle or of at least one component of the brake pad, the method comprising:
  prior to an installation or an initial commencement of operation of the brake pad and/or of the at least one component of the brake pad in the disk brake device or in the vehicle, using a contactlessly operating optical laser triangulation method to ascertain the at least one geometrical characteristic of the brake pad,
  wherein the at least one component includes one of:
    a carrier panel and multiple exchangeable friction elements that are pivotably held directly on the carrier panel the friction elements are, by ball segments formed on the rear side thereof, arranged pivotably in a ball socket of the carrier panel, the ball socket has a bore which transitions into a bore of the carrier panel, fastening pegs extend from the ball segments of the friction elements, and the fastening pegs bear one bracing spring which braces the friction element in the direction of the ball socket, or
    a carrier panel, multiple carrier plates and multiple exchangeable friction elements that are held directly on one carrier plate of the multiple carrier plates, and wherein, multiple carrier plates with friction elements held thereon are connected to the carrier panel, the carrier plates have, on their rear side pointing away from the friction elements, ball segments which are arranged pivotably in ball sockets of the carrier panel, the ball sockets of the carrier panel each have a bore which transitions into a bore of the carrier panel, and a peg extends from the ball segment of a carrier plate of the multiple carrier plates which engages into the bore of the carrier panel.

2. The method of claim 1, wherein the at least one geometrical characteristic of the brake pad or of the at least one component of the brake pad is formed by one of the following characteristics: the type, the form, or the position of the carrier plates or of the carrier panel or of the friction elements or of the fastening pegs or of the pegs or of the bracing springs.

3. The method of claim 1, wherein the contactlessly operating optical laser triangulation method ascertains the type, the form, or the position of at least one component of the brake pad.

4. The method of claim 3, further comprising performing a comparison with predefined setpoint values or setpoint value ranges for the type, the form, or the position of at least one component of the brake pad to detect manufacturing or installation faults in the brake pad.

5. The method of claim 4, further comprising generating a fault signal in response to detection of a manufacturing or installation fault in the brake pad.

6. The method of claim 1, wherein the ascertainment of the at least one geometrical characteristic of the at least one component of the brake pad is performed in a state of the component installed on the brake pad or in a state of the component prior to the installation on the brake pad.

7. The method of claim 1, wherein the contactlessly operating optical laser triangulation method includes using a laser to project a spot of light onto the brake pad and/or onto the at least one component of the brake pad in an illumination direction, and the light reflected by the brake pad or by the at least one component of the brake pad in an observation direction is imaged on a light-receiving element, and wherein the type or the form of the brake pad or the type, the form, or the position of the at least one component of the components of the brake pad is ascertained based on the angle between illumination direction and observation direction by triangulation.

* * * * *